US009231955B1

(12) United States Patent
Mehresh et al.

(10) Patent No.: US 9,231,955 B1
(45) Date of Patent: Jan. 5, 2016

(54) MULTIPARTY AUTHORIZATION FOR CONTROLLING RESOURCE ACCESS

(71) Applicant: EMC Corporation, Hopkinton, MA (US)

(72) Inventors: Ruchika Mehresh, Natick, MA (US); Millard C Taylor, II, Chapel Hill, NC (US); Ankita Pawar, Framingham, MA (US); Obeahon O. Okaiwele, Brighton, MA (US); Xuan Tang, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/225,697

(22) Filed: Mar. 26, 2014

(51) Int. Cl.
*G06F 7/04* (2006.01)
*H04L 29/06* (2006.01)

(52) U.S. Cl.
CPC .................................. *H04L 63/101* (2013.01)

(58) Field of Classification Search
CPC ................................ H04L 63/08; H04L 63/20
USPC ........................... 726/4, 1; 713/169; 709/224
See application file for complete search history.

(56) References Cited

U.S. PATENT DOCUMENTS

| 6,055,637 A * | 4/2000 | Hudson et al. ................. 726/20 |
| 6,418,420 B1 * | 7/2002 | DiGiorgio et al. .............. 705/40 |
| 2006/0271783 A1 * | 11/2006 | Wong et al. .................. 713/169 |
| 2012/0011578 A1 * | 1/2012 | Hinton et al. ..................... 726/8 |
| 2012/0151568 A1 * | 6/2012 | Pieczul et al. .................... 726/8 |
| 2013/0047216 A1 * | 2/2013 | Ajitomi et al. .................... 726/4 |

* cited by examiner

*Primary Examiner* — Abu Sholeman (57) ABSTRACT

The subject disclosure is generally directed towards an automated mechanism in a computer network or system that controls resource access to any resource designated as needing multiparty authorization. In one aspect, a resource that needs multiparty authorization before access is allowed is identified, along with policy that specifies an authorizer (or multiple authorizers) for the resource. An access control list may contain metadata that indicates the need for multiparty authorization. Authorization may be provided via a token, which may be cached for future use.

20 Claims, 5 Drawing Sheets

MULTIPARTY AUTHORIZATION FOR CONTROLLING RESOURCE ACCESS

BACKGROUND

The significant amount of power that is given to administrators can have serious consequences with respect to resources. Among other potential issues, an administrator has access to virtually any resource in a system or a network.

As a result, an administrator may inadvertently delete critical data, for example, such as encryption keys that are needed to access encrypted data, or an important file. As another example, some resources contain sensitive data that are not supposed to be accessed by anyone but the owner and/or without the owner's consent. However, a rogue administrator may access the sensitive data for malicious purposes. Even when an administrator may not be compromised and is acting innocently, the administrator may make a mistake that leads to a system or resource compromise, whereby the data is inadvertently exposed or otherwise made vulnerable to being accessed.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards protecting a resource by providing a need for multiparty authorization with respect to operating on that resource. With an appropriately multiparty authorization-controlled resource, no one person is able to perform an operation on that resource without each other party's authorization. As will be understood, among its benefits, multiparty authorization shields a system against the compromise of an administrator or administrative mistakes that may lead to system compromise.

In one or more aspects, a resource for which multiparty authorization is desired is identified as having multiparty authorization associated with that resource. In one or more implementations, this is accomplished by access control metadata associated with the resource, such as an attribute of an access control list, or by the resource being identified (e.g., in a data store) as being multiparty authorization controlled. A file stream may also contain such metadata. In order to access a multiparty authorization-controlled resource, authorization from each party as identified in multiparty authorization policy data is needed.

It should be understood that any of the examples herein are non-limiting. For instance, one or more examples used herein refer to access control lists, however this is only one way to implement multiparty access control. Data stores and so forth may alternatively contain the metadata that indicates that a resource is multiparty access controlled. As another example, tokens are described herein as being used to provide the authorization, but alternative techniques may be used. As yet another example, many of the examples herein are directed towards a network resource, however the technology also applies to a given system/system resource, whether or not part of a network. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in eye gaze detection in general.

Figure 1:
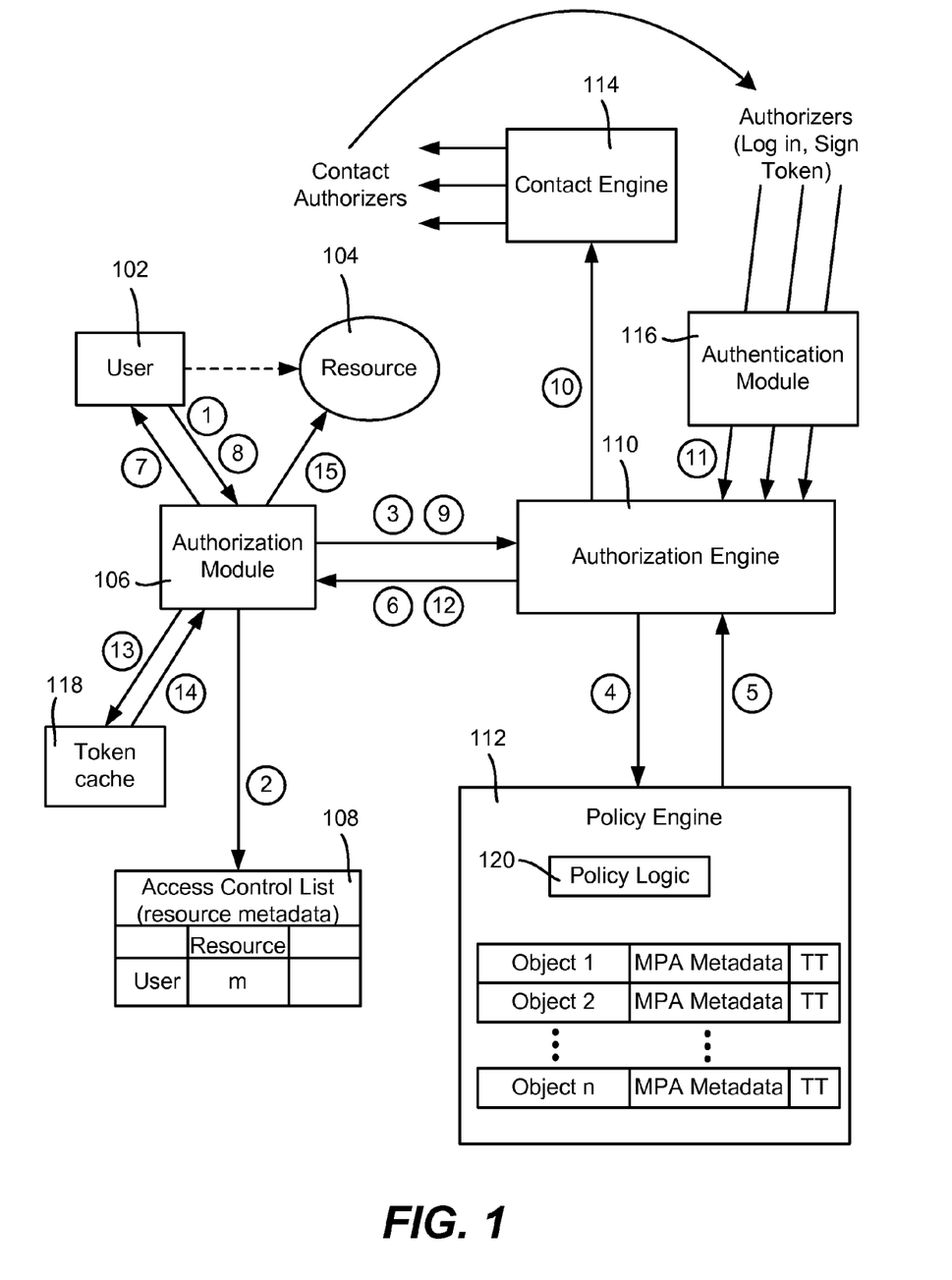
FIG. 1 is a block diagram showing an example configuration of various example components that may be used to perform multiparty authorization to control resource access, according to one or more example embodiments.

FIG. 1 is a block diagram representing aspects of one embodiment of the technology described herein. In FIG. 1, various arrows are labeled with circled numerals indicative of an example flow of data and/or operations among the exemplified components. Note that in FIG. 1 various components are shown as modules and engines, but it is readily appreciated that any such component may be combined with one or more other components into a larger component, and/or split into a lesser number of components.

In general, a user 102 who is seeking an operation with respect to a resource 104, such as to access a critical resource including but not limited to read, write or execute access, contacts an authorization module 106 (e.g., a mechanism/logic) to check whether he or she is authorized to perform the requested operation on the resource 104. In most systems or networks, such access control enforcement is automatically performed and is transparent to the user unless access is denied. This communication is represented in FIG. 1 via circled arrow one (1). In one or more implementations, the authorization module 106 checks the resource's associated access control list 108 (circled arrow two (2)).

In this example, the access control list 108 contains metadata that indicates that the resource is protected under multiparty authorization control; (note that the user is one party, and thus "multiparty" authorization as used herein means at least one additional authorizing party). For example, the access control list 108 may be extended to include a new access control attribute, shown in FIG. 1 as 'm' (or the like) to indicate that multiparty authorization is needed to allow the operation. Existing access control lists may be extended with a bit (0=not needed, or 1=needed) to include this option, for example; (note that it is feasible for there to be different types of multiparty authorization protection in a given network or for a given system. For example, a file may require multiparty authorization to be opened for write access, but not for read access. This may be accomplished by a two-bit resource metadata attribute, for example). As can be readily appreciated, such access control may be set by the creator/owner, by a policy or other administrator, by an automated process that sets policy data on files, and/or the like.

Note that instead of access control lists, multiparty access control metadata may be associated with a resource in alternative ways. For example, the authorization module 106 may maintain a list of resources that are multiparty access controlled; (alternatively, instead of such an inclusion list, it is feasible for all resources to be multiparty access controlled by default, except those on such a list; that is, the list is an exclusion list rather than an inclusion list). Yet another way to have such an association is to have resource metadata include a pointer to a location (such as a URL) that provides the information rather than the metadata itself containing the information.

Further, instead of individual resources, sets of resources, such as files contained in a file folder or on a certain server/location, may be multiparty access controlled. Certain types of resources may be automatically multiparty accessed controlled by the authorization module 106; for example, resources with a certain file extension (e.g., '*.medrecord') are recognized as being automatically multiparty accessed controlled.

Figure 2:
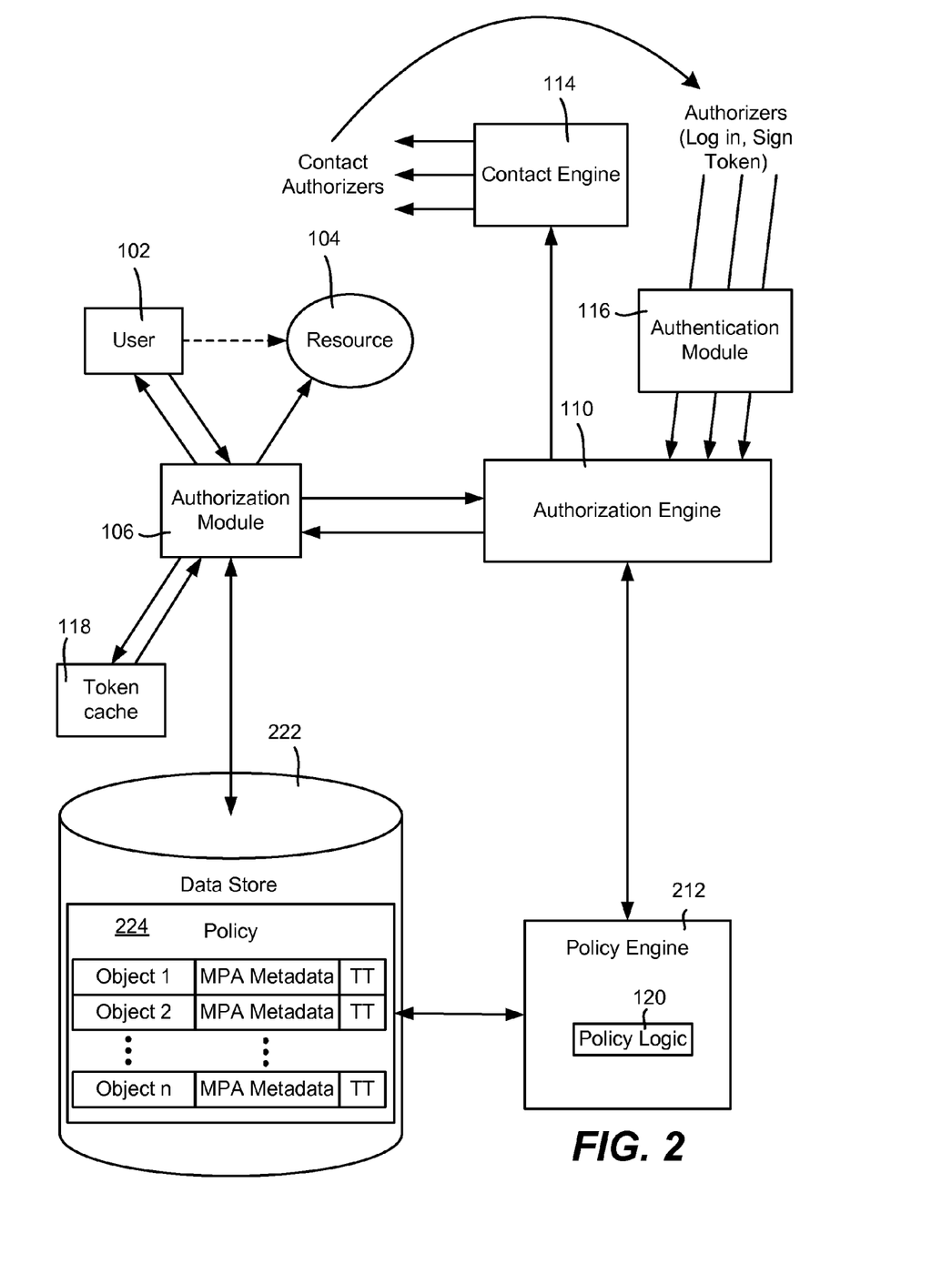
FIG. 2 is a block diagram showing an alternative example configuration of various example components that may be used to perform multiparty authorization to control resource access, according to one or more example embodiments.

Still another way to associate multiparty access control metadata with a resource is in a data store 222 (which may be a distributed and/or centralized data store) such as a database table or key-value pair, as generally represented in FIG. 2. In FIG. 2, any object (resource) that is in the data store 222 is multiparty access controlled. The object's multiparty authorization (MPA) policy metadata 224, described below with reference to a policy engine 112, may be directly associated with the object identifier and directly returned to the authorization module 106. This may be a desirable mechanism in an environment in which it is not straightforward to add an attribute to the access control list, however this needs a lookup operation for each resource. If adding an attribute to the attribute control list is feasible, the implementation of FIG. 1 may be used, or a hybrid model between FIGS. 1 and 2 may be used, e.g., only multiparty access controlled objects need be looked up in the data store 222.

In one or more implementations, upon detecting the metadata that indicates the need for multiparty authorization for a resource operation, the authorization module 106 communicates with an authorization engine 110 (circled arrow three (3)). When so contacted, the authorization engine 110 determines which party or parties need to be contacted for authorizing the access request. In one or more implementations, this is performed with the help of a policy engine 112 (circled numerals four (4) and five (5)).

In this example, the policy engine 112 stores the multiparty authorization policies as metadata associated with each resource (object) that is multiparty access controlled. For example, this information may be stored as a capability-based list or other suitable data structure that contains entries for each object and the multiparty authorization (MPA) policy metadata that describes the authorizers (e.g., administrators) for that object and their respective types (e.g., owners/readers/writers/and so forth). In this way, the authorization engine 110 determines what needs to be done in order to obtain the multiparty authorization, including from which party or parties authorization is needed.

Note that a user is only one typical type of authorizer, and, for example the technology may apply to user groups. Another type of authorizer may be an automated process that makes policy decisions as to whether to authorize an operation, (at least as one authorizer). For example, automated authorization access based upon policy data may be related to current state information, e.g., access to a file is denied by policy at a certain time of day (e.g., to allow transactional updates), or denied while a backup operation is being performed, without the backup administrator having to deal with any authorization request.

The policy information (or data corresponding thereto) may be propagated back to the user 102 (arrows six (6) and seven (7); note that whether to propagate may be part of the policy). The user 102 may review the information about the kind of access request that will be sent out to the authorizer or authorizers. Thus, one or more implementations may choose to notify the user and get a confirmation before sending out the notifications and initiating the authorization, e.g., the process of token signing as described below.

If a user chooses to continue with the authorization process, the authorization engine contacts the authorizers using a contact engine 114 (arrows nine (9) and ten (10)). The contact engine 114 automates a contact procedure by determining the best way to contact the authorizers (email, phone, pager, and so forth), such as based upon predefined policies and/or user preferences.

In one implementation, the authorizer(s) perform their respective authorization(s) by digitally signing a token in any suitable way. For example, the notification(s) sent out to the authorizer(s) may contain a token ID for the specific access request that they need to sign, and the address of the authorization engine 110.

In the example of FIG. 1, the authorizers log in to the authorization engine 110 to sign the token, (as shown via arrow eleven (11), after getting authenticated using the existing authentication module 116 or another suitable authentication module). Once the token is signed, the token is returned (arrow twelve (12)) to the authorization module 106. The authorization module 106 may cache the token in a token cache 118 (arrows thirteen (13) and fourteen (14)). Note that a token may be one that is non-cacheable, e.g., single use only.

As shown via arrow fifteen, if properly authorized by each party, the user 102 gets the authorization to operate on (e.g., access) the resource 104. Access remains allowed until the token expires/is revoked or surrendered. Note that a check of the cache may be performed before the authorization engine is contacted (arrow three (3)), because if an appropriate token is cached from a previous request, the token grants the multiparty authorization. It is possible that a partial token may exist, e.g., one authorizer's authorization is expired but not another's, and thus not all authorizers may need to be contacted each time.

Complex policy schemes may be implemented, such as enforced by policy logic 120 in the policy engine 112 (FIG. 1) or 212 (FIG. 2). For example, a policy may require that n of m (e.g., two of three) administrators are needed to authorize an operation. Another policy may specify types of authorizers, one from class A is needed, plus two from class B, and so on. Serial/ordered approval may be specified in policy, e.g., only after the CFO approves will the CEO be requested to approve. Voting schemes and the like may be implemented via policy. Any of these and other example schemes may be combined.

Figure 3:
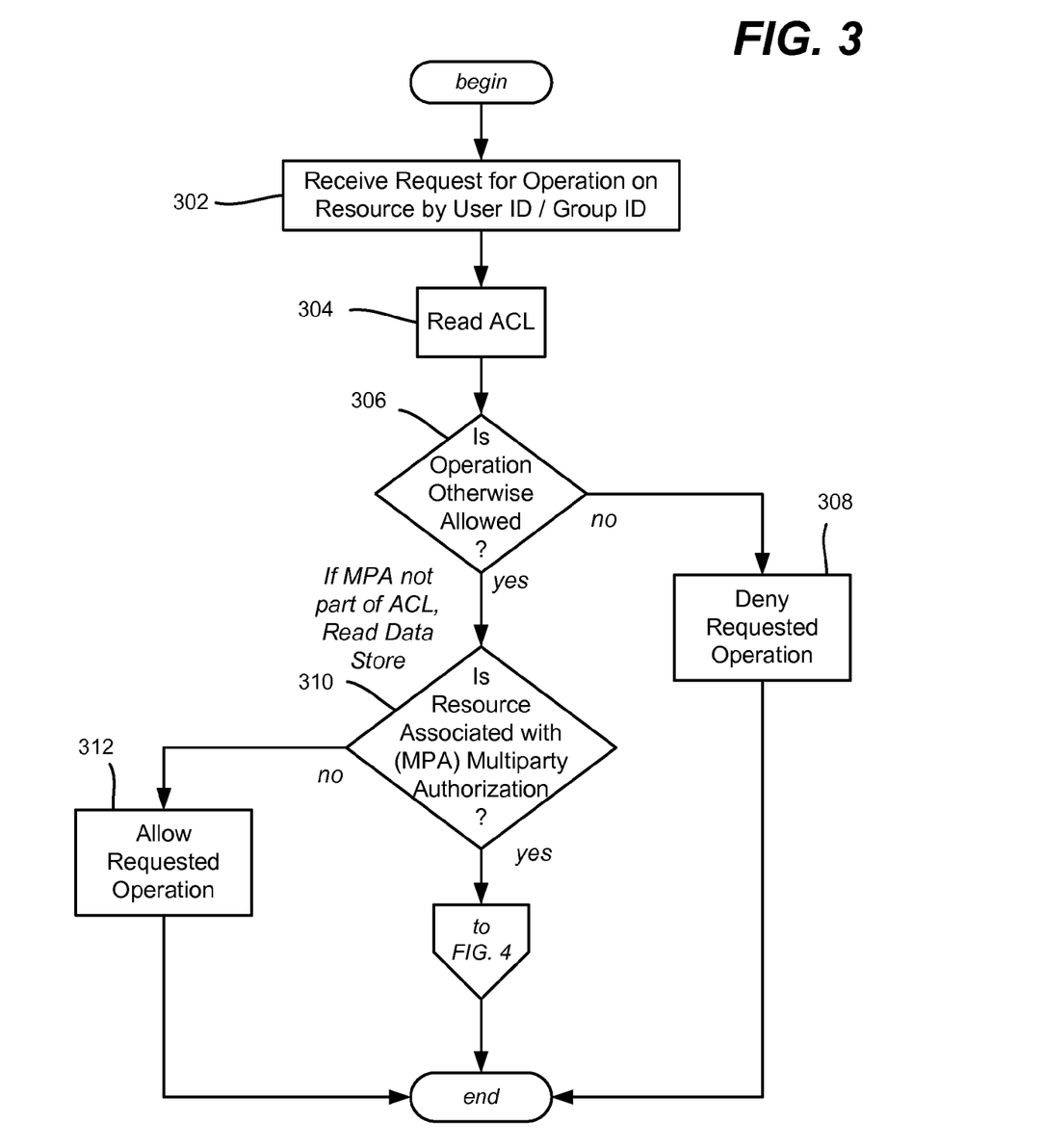
FIGS. 3 and 4 comprise a flow diagram showing example steps that may be taken in performing multiparty authorization to control resource access, according to one or more example embodiments.
Figure 4:
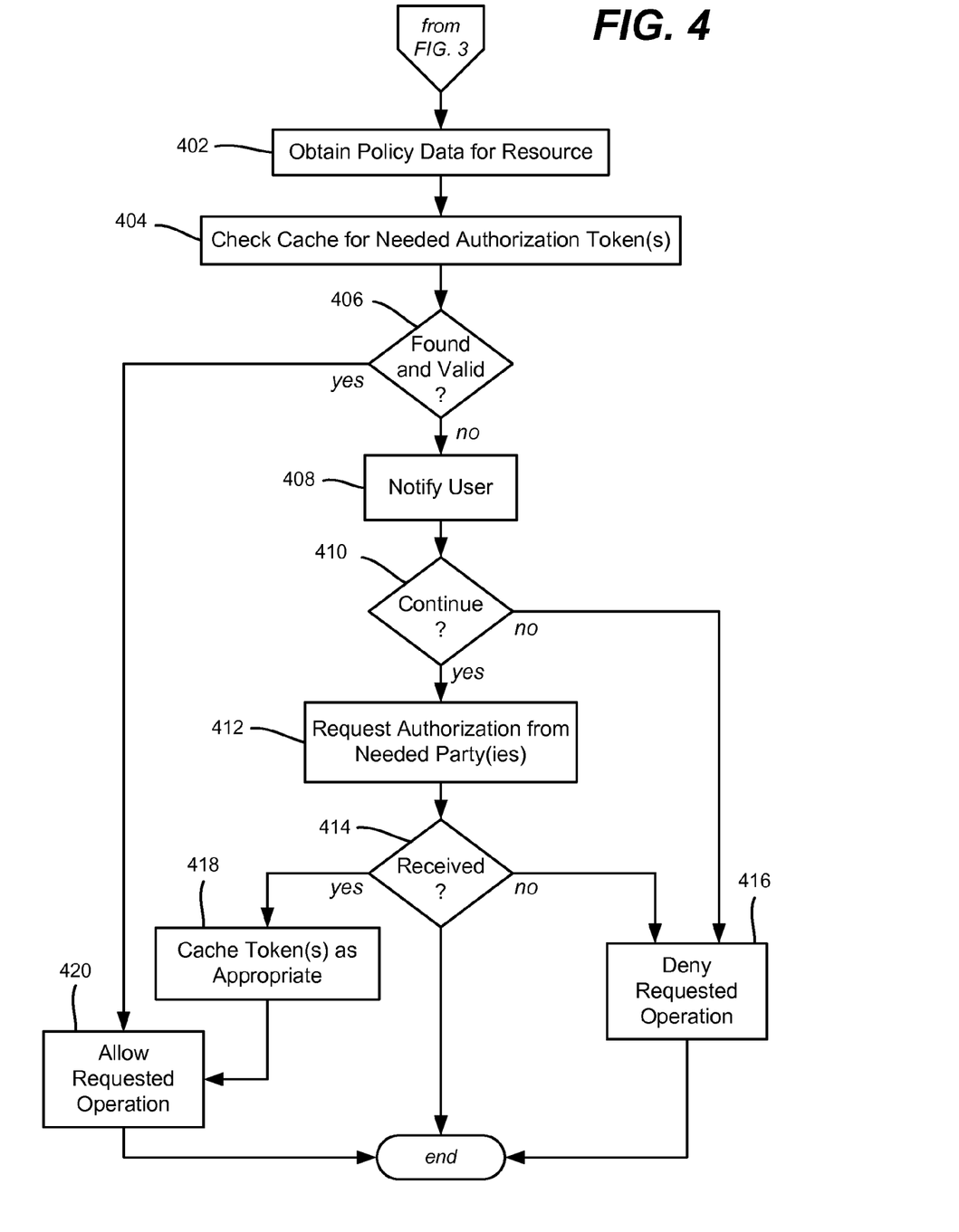

FIGS. 3 and 4 comprise a flow diagram including example steps for implementing multiparty authorization as generally described herein, beginning at step 302 where a request for an operation on a resource is received at the authorization module, e.g., to access an object. Step 304 reads the access control list (ACL) of the resource.

Step 306 evaluates the access control list against the user permissions, and if the operation is not otherwise allowed for this user, the request is denied at step 308. If not denied, the process continues.

As described with respect to FIG. 1, the multiparty access control metadata may be present as an attribute in the access control list. In such an embodiment, the multiparty access control attribute that is present is evaluated. In an embodiment such as FIG. 2 wherein not present, the data store or the like is read to obtain this information.

Step 310 evaluates the multiparty access control metadata to see whether multiparty access control is triggered. If not, (and assuming there are no other security checks), step 310 branches to step 312 to allow the operation. Otherwise the multiparty access control part of the procedure continues, as exemplified in the steps of FIG. 4.

Note that in general, the example implementations of FIGS. 1, 3 and 4 are such that very little change needs to be done to existing mechanisms to implement multiparty access control; e.g., a single access control list attribute triggers the multiparty access control process, (in an embodiment in which the multiparty access control attribute is extendable into the access control list). As can be readily appreciated, this is highly efficient and adds very low overhead in a system in which access control checking is already performed and most files do not need multiparty access control.

Step 402 of FIG. 4 represents obtaining the policy data for the resource; (in an alternative as in FIG. 2, this information already may have been obtained). Based upon the policy information, the authorization module determines what authorization is needed and from which authorizer or authorizers.

Steps 404 and 406 check the token cache to see if the authorization is already present and still valid (e.g., is not expired or on a revoked token list). If so, the process allows the requested operation at step 420. Otherwise authorization is needed. Note that the cache may be cleared of invalid (e.g., expired) tokens only occasionally, and thus step 406 may check the expiry data for each token.

Step 408 represents notifying the user of the upcoming need for multiparty authorization, with the user's decision evaluated at step 410. The user may decide not to continue at step 410, in which even the requested operation is denied (step 416). There may be a limited decision time given to the user, which may be set forth in the policy and/or by default.

If the user decides to continue, at step 412 the authorization is requested from the needed parties, e.g., as communicated by the contact engine. Enforcement of multiparty access control is represented by step 414. If authorization is received as evaluated at step 414, the token is cached at step 418 (if of a type that is allowed to be cached), and the operation allowed at step 420.

If authorization is not received, the requested operation is denied at step 416. Note that an authorizer may explicitly decide to actively attempt to deny the requested authorization, or the request may time out.

It is also feasible for more than a binary yes/no operation. For example, an authorizer may put a time limit on authorization. An authorizer may allow read access to a file, but not write access. Such information may be encoded in the token.

Further, an authorizer may revoke a token. For example, an authorizer may authorize an operation, but then later realize that he or she made a mistake or become suspicious regarding the access request. It is also feasible for an authorizer to change the expiration of a token, e.g., the token sent back is set to expire in three days, but the authorizer may decide that is too long (or not long enough) and thus shorten (or lengthen) the expiration time. The authorizer authenticates via the authentication module, and provides the authorization engine with the revocation or change request, which is communicated (e.g., via a list) to the authorization module. The authorization module deletes the token or modifies it as requested.

Note that the use of tokens also prevents the repudiation of an authorization. For example, token audit trails may be maintained, such that entities that approve an operation may have their approvals linked to the operation in a way that cannot be repudiated.

In one or more implementation, here are different types of tokens that may be adapted for diverse situations. As represented in FIG. 1, the policy engine 112 may maintain a token type (TT) field or the like that identifies the type of token in use for an object's multiparty authorization. Note that different authorizers may have different token types, and thus the field may be extended or merged into the metadata field. Token types include, but are not limited to, pre-authorization tokens, inline authorization tokens and post-authorization tokens.

Pre-authorization tokens are such that authorization to perform an operation is provided with the token. By reproducing the token, the requester proves the right to perform the operation.

By way of example, consider that a patient needs to authorize access to a health record to a third party, e.g., an insurance company. The patient may use and sign a pre-authorization token that gives the insurance company the right to access the record until the authorization expires. The pre-authorization token may be limited with an expiration date, e.g., the insurance company should be able to take care of this in two days, whereby two days is deemed a sufficient expiration time (although the patient may revoke or modify this token as described above).

An inline-authorization token provides authorization to perform an operation pending review by the authorizer. By reproducing the token, the requester proves the right to perform the operation, but pending review; the operation is only completed post review. By way of example, consider that a doctor wants to change data in a field in a health record. Before consenting to the change, the patient reviews the change to see if he agrees, and then approves the change or not. Only if and when approved does the actual change take place. In general, this is a one-time use token.

A post-authorization token provides the requester with the rights to perform several operations pending review. The changes made by the requester are logged (e.g., listed) and sent for review as a set of changes. Such changes are only committed after the review, if approved. Note that this is different from inline-authorization in which the requester has to wait for the review after each action. By way of example, consider that a database developer makes a number of changes to a database, e.g., adds new fields. A supervisor gets a list of the changes, reviews the changes made and approves or does not. The changes are not committed until approved. The committing of changes may be made as a whole, or in individual parts.

A variation of the post-authorization token is to allow the changes before a review, but unwind the changes if the reviewer does not authorize them. For example, consider the above example where a database developer adds new fields. In some situations, it may be beneficial to try out the new fields for awhile to see how employees use them. The authorizer can then decide whether to commit the changes or not. As before, the committing of changes may be made as a whole or in individual parts.

Note that it is feasible to have an inline or post-authorization token specify a "time-out" period for the review and approval, e.g., if not approved by [some future time], the changes will be automatically rejected. Automatic timed-based approval is also an alternative.

As can be seen, there is provided automated multiparty authorization-based access control. Clients may use it with their data, e.g., clients in the healthcare domain need to comply with standards like HIPAA where access to patient records may need to be authorized by multiple parties. To avoid violations, the access control mechanisms described herein assist in making the regulatory compliance mandatory.

In another example, storage devices (e.g., hard drives) associated with a storage pool may be "spun up" to be ready for I/O pending the encryption keys to be provided (sometimes referred to as controlled availability). For instance, the keys may be removed over the weekend to only allow access during normal working hours. Thereafter, multiple administrators are needed to make the keys available.

The time overhead involved in gathering authorizations from multiple parties is reduced by employing a token-based implementation. It has a one-time cost of gathering authorizations but afterwards, the authorized tokens can be reproduced to perform a desired operation.

Automation of multiparty authorization thus not only saves time but also ensures that everything is done as per the defined rules. Extending multiparty authorization as a token-based service reduces the time overhead involved in gathering multiple authorizations and provides enhanced security over the existing solutions.

Moreover, in one or more implementations, virtually seamless integration into existing storage systems is facilitated. Indeed, many existing systems are mostly based on access control lists. The technology described herein allows multiparty authorization to be integrated into existing infrastructure without significantly disturbing it.

EXAMPLE COMPUTING DEVICE

The techniques described herein can be applied to any device or set of devices capable of running programs and processes, such as the any of the components of FIGS. 1 and 2, and/or the logic of FIGS. 3 and 4. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
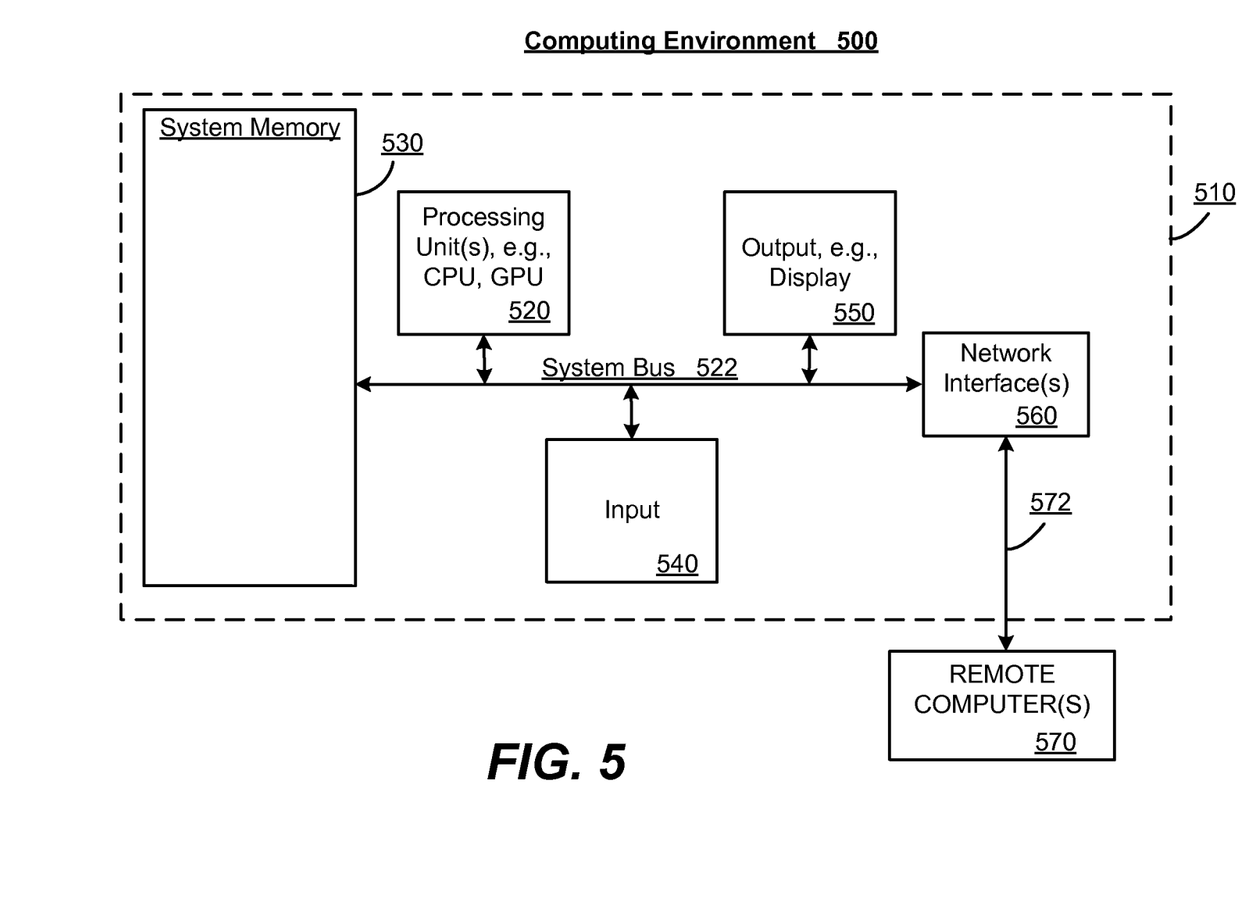
FIG. 5 is a block diagram representing an example computing environment into which aspects of the subject matter described herein may be incorporated.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the example computing system environment 500.

With reference to FIG. 5, an example device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of machine/computer-readable media and can be any available media that can be accessed by computer 510. The system memory 530 may include computer storage media in the form of volatile and/or nonvolatile memory such as read only memory (ROM) and/or random access memory (RAM), and hard drive media, optical storage media, flash media, and so forth. By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method in a computer network or computer system, the method comprising:
   receiving, from a client, a request for an operation on a resource associated with a server to form a requested operation;
   upon receiving the request, automatically determining, by an authorization mechanism associated with the server, whether the resource is associated with access control metadata, the access control metadata indicates the resource is multiparty access controlled and a multiparty authorization is required for the requested operation on the resource;
   on condition that the resource is not associated with the access control metadata, allowing the requested operation on the resource; and
   on condition the resource is associated with the access control metadata, checking a token cache, by an authorization module of the server, to determine whether one or more tokens associated with one or more entities and configured to authorize the requested operation are present in the token cache and valid,
      on condition that the one or more tokens configured to authorize the requested operation are present in the token cache and valid, granting the multiparty authorization and allowing the requested operation; and
      on condition that the one or more tokens configured to authorize the requested operation are not present in the token cache and valid, obtaining the multiparty authorization before allowing the requested operation on the resource.

2. The method of claim 1, wherein determining whether the resource is associated with the access control metadata that indicates the need for multiparty authorization comprises:
   evaluating an attribute of an access control list, the attribute indicates the resource is protected under multiparty authorization control.

3. The method of claim 1, wherein obtaining the multiparty authorization comprises:
   determining the one or more entities to contact for the multiparty authorization based on the multiparty access control metadata, wherein the multiparty access control metadata is associated with the resource in a data store.

4. The method of claim 1, wherein obtaining the multiparty authorization comprises:
   on condition that a first token of the one or more tokens is stored in the token cache and a second token of the one or more tokens is not stored in the token cache, accessing the token cache to obtain the first token; and
   transmitting a request for the multiparty authorization to an authorizer of the one or more entities corresponding to the second token.

5. The method of claim 1, wherein the one or more tokens comprise a signed pre-authorization token, the method further comprising:
   allowing the requested operation on the resource upon receiving the signed pre-authorization token.

6. The method of claim 1, wherein the one or more tokens comprise an inline authorization token, the method further comprising:
   receiving a pending change to the resource, and waiting for authorization via the inline authorization token before allowing access to commit the pending change.

7. The method of claim 1, wherein the one or more tokens comprise a post-authorization token, the method further comprising:
   receiving a plurality of pending changes to the resource, and waiting for authorization via the post-authorization token before allowing access to commit at least one pending change of the plurality of pending changes.

8. A system comprising:
   one or more processors;

a memory, the memory configured to contain executable code executed by the one or more processors, including code corresponding to authorization logic; and a system bus, the system bus configured to couple the memory to the one or more processors, wherein the one or more processors execute the authorization logic to:

determine whether a resource is associated with access control metadata, the access control metadata indicates that the resource is multiparty access controlled and multiparty authorization is required for the requested operation, the resource is associated with a requested operation;

on condition that the resource is not associated with the access control metadata, allow the requested operation; and on condition that the resource is associated with the access control metadata, determine whether authorization is not yet obtained from one or more authorizers identified in multiparty authorization policy metadata associated with the resource, wherein the multiparty authorization policy metadata identifies the one or more authorizers to contact to obtain the multiparty authorization for the requested operation, on condition that the authorization is obtained from the one or more authorizers, access the authorization from a token cache to obtain the authorization and grant the multiparty authorization; and on condition that the authorization is not yet obtained from the one or more authorizers, transmit a request for the authorization to the one or more authorizers.

9. The system of claim 8, wherein the authorization logic is configured to access an access control list to determine whether the resource is associated with the access control metadata, wherein an attribute of the access control list indicates that multiparty authorization is required for the requested operation.

10. The system of claim 8, wherein the authorization logic is coupled to a contact engine that identifies the one or more authorizers, and determines one or more contact modes for contacting the one or more identified authorizers.

11. The system of claim 8, wherein the authorization logic is coupled to a data store containing the multiparty authorization policy metadata.

12. The system of claim 11, wherein the data store containing the multiparty authorization policy metadata is incorporated into or coupled to a policy engine that includes policy logic.

13. The system of claim 8, further comprising:
an authorization engine, a policy engine and a contact engine, wherein the authorization logic is coupled to the policy engine via the authorization engine, and is coupled to the contact engine via the authorization engine.

14. The system of claim 8, wherein the token cache contains one or more tokens corresponding to authorizations received from authorizers, the one or more tokens including at least one of a pre-authorization token, an inline authorization token, or a post-authorization token.

15. One or more machine-readable memories having machine-executable instructions, which when executed cause one or more processors to:

determine that a resource associated with a storage device to which a user is requesting access is multiparty access controlled based on access control metadata associated with the resource, the access control metadata indicating that the resource is protected under multiparty authorization control and multiparty authorization is required for the requested access;

checking a token cache, by an authorization module associated with the storage device, for one or more tokens authorizing access to the resource;

on condition that the one or more tokens are stored in the token cache, accessing the token cache to obtain the one or more tokens and grant access to the resource;

on condition that the one or more tokens are not stored in the token cache, obtaining the one or more tokens from the one or more authorizers to authorize access to the resource;

upon obtaining the one or more tokens, allowing the user to access the resource based upon the one or more tokens; and cache the one or more tokens in the token cache.

16. The machine-readable memories of claim 15, having further machine-executable instructions comprising:
looking up the one or more authorizers in policy data associated with the resource; and
determining one or more contact modes for contacting the one or more authorizers.

17. The machine-readable memories of claim 15, wherein determining that the resource is multiparty access controlled comprises:
reading an access control list associated with the resource, wherein an attribute of the access control list indicates the multiparty authorization is needed to allow the access to the resource.

18. The method of claim 1, wherein obtaining the multiparty authorization further comprises:
on condition the one or more tokens associated with one or more entities and configured to authorize the requested operation are not present in the token cache or the one or more tokens are not valid, contacting the one or more entities, by the authorization engine, to obtain the multiparty authorization for the requested operation; and
transmitting a request for the multiparty authorization to the one or more entities.

19. The method of claim 1, further comprising:
evaluating multiparty authorization policy metadata to identify one or more entities to contact for the multiparty authorization for the requested operation.

20. The method of claim 1, further comprising;
identifying a type of access associated with the request for the operation on the resource, wherein the multiparty authorization corresponds with the type of access.

* * * * *